INVENTORS
HENRY E. KARRER
JERRY G. LEACH

BY *A. C. Smith*

ATTORNEY

United States Patent Office 3,561,832
Patented Feb. 9, 1971

3,561,832
QUARTZ RESONATOR PRESSURE TRANSDUCER
Henry E. Karrer, Palo Alto, and Jerry G. Leach, Santa
 Clara, Calif., assignors to Hewlett-Packard Company,
 Palo Alto, Calif., a corporation of California
Filed Dec. 5, 1969, Ser. No. 882,501
Int. Cl. H01v 7/00
U.S. Cl. 310—9.6                           16 Claims

ABSTRACT OF THE DISCLOSURE

A pressure transducer uses a precision piezoelectric quartz resonator that exhibits linear changes in frequency when subjected to radial compressive stresses. A cylindrical quartz tube is integral with the circular resonator and acts as a diaphragm which transfers and concentrates the stress from the applied pressure onto the periphery of the resonator. The tube and resonator are fabricated from a single quartz crystal to minimize nonelastic effects.

BACKGROUND OF THE INVENTION

Related copending application—678,306, filed Oct. 26, 1967.

The effect of externally applied static stress on the frequency of piezoelectric quartz resonators has been known for some time. This effect has been demonstrated both by hydrostatic loading and by edge loading resonator plates. In hydrostatically loaded resonators of AT-cut and BT-cut quartz, reports of experimental data have indicated that the changes in resonator frequency with changes in pressure are approximately linear within experimental error up to 15,000 lbs./in.$^2$.

One problem encountered in utilizing quartz crystal resonators as pressure transducers is in devising a method of applying stress to the resonator which is free from hysteresis errors. The methods employed in the aforementioned reports are inadequate because the direct application of hydrostatic pressure to the resonator has the disadvantage that the pressure transmission fluid must be in contact with the active region of the resonator. This damps mechanical vibration and degrades the frequency stability. And applying the force with anvils on the edge of the resonator is unsatisfactory because of the hysteresis errors caused by changing contact areas and localized stress concentration.

SUMMARY OF THE INVENTION

In accordance with the preferred embodiment of the present invention, the resonator is constructed as an integral part of a quartz cylinder. The resonator and cylinder are constructed from a single piece of crystalline quartz so that the periphery of the resonator will be uniformly and elastically stressed by the external pressure. The transducer has quartz end caps that are aligned so that the crystalline lattice is essentially continuous across the joint. The joint is made with a thin film of elastic cement. The entire assembly can be immersed in a hydrostatic fluid which can be pressurized. The cavity may be evacuated or helium filled to achieve a high degree of frequency stability and low mechanical damping. Since the entire sensing element is made from a single crystal and the resonator is isolated from the pressure media, hysteresis errors are minimized and maximum frequency stability is achieved. The cylindrical walls of the quartz pressure transducer act as a diaphragm and effectively transfer and concentrate the stress from the external pressure radially about the periphery of the resonator.

DESCRIPTION OF THE PREFERRED EMBODIMENT

Figure 1:
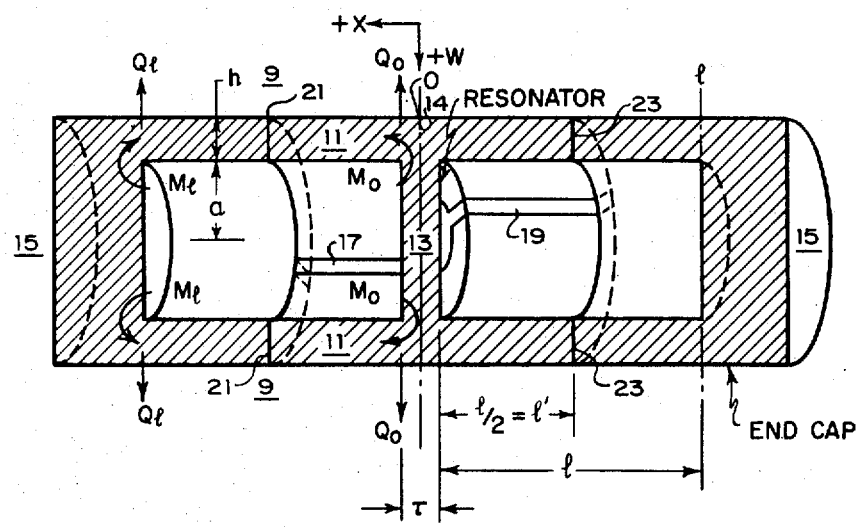
FIG. 1 is a perspective sectional view of the quartz pressure transducer in accordance with the preferred embodiment of the present invention.

Referring now to the sectional view of FIG. 1, there is shown the preferred embodiment of the pressure sensing element 9 of the present invention which includes a circular piezoelectric resonator 13 constructed inside a cylinder 11 of quartz. The cylinder may be oriented with respect to the crystalline axis for selected temperature characteristics such that the resonator section 13 may be AT or BT cut, as described according to IRE Standards for Quartz, Ref. 7. The resonator is operated in the third overtone thickness shear mode of vibration having a nominal frequency of 5 mHz. The surfaces of the resonator section 13 are spherically biconvex about the median plane 14 to confine the mechanical vibrations to the central section of the plate and thus minimize acoustic loss through the cylinder walls 11. A radius of curvature was selected which insured a mechanical Q of greater than 10$^6$ and decoupling from undesired modes of vibration. The AT or BT cut provides two degrees of freedom for minimizing temperature effects which may be selected as follows:

First, the temperature coefficient of frequency at zero pressure can be made zero at any temperature in the range 0 to 100° C.

Second, the temperature coefficient of pressure sensitivity can be made zero over the temperature range 0 to 100° C.

Having selected the proper orientation of a quartz crystal, for example, by X-ray diffraction techniques, a solid cylinder of quartz is first cored out of the crystal. The resonator body portion 9, 11, 13 and end cap portion 15 are then formed from the quartz cylinder using conventional cutting and grinding techniques. The dimensions of the finished parts are described in detail hereinafter. Finally, all parts are optically polished and cleaned. A metallic film 17, 19 is vapor deposited on the resonator surfaces and along the inside of the cylinder and across the joints 21, 23 to provide resonator electrodes and external electrical connections. By varying the thickness of gold deposited on the resonator surface, the zero pressure frequency can be adjusted within several Hertz of 5 mHz. A thin layer of elastic cement such as Pyroceram is then deposited onto the joints and the crystal axes of the end caps 15 and body 9, 11, 13 are then aligned accurately and the unit is sealed in a helium atmosphere at atmospheric pressure.

DIMENSIONAL LIMITATIONS AND ANALYSIS

The unsupported cylinder 11 between the resonator 13 and end cap 15 is shown in FIG. 1. When an external pressure acts on the cylinder, axisymmetric shearing forces (Q) and bending moments (M) are created at each end of the cylindrical sections. Specific values of Q and M depend on the pressure, and the boundary conditions at the ends and the cylinder dimensions.

The dimensions of cylinder 11 determine the method of analysis. If the cylandrical shell 11 is very thin ($h/a \ll 1$), the shell can be considered as a membrane subject only to longitudinal stress and to hoop stress (i.e. stress about the perimeter or girth of the cylinder). This theory neglects all bending stresses and vertical shearing stresses, since these are small in a thin membrane. If the ends of the cylinder 9 are restrained along the edges (as they are by the resonator 13 and end caps 15), the bending becomes significant in the region near the ends and the theory must be expanded to include these effects. This is called the "thin wall shell theory" and is generally assumed valid for $h/a < 1/10$ with any type of boundary conditions.

The thin wall theory predicts that the bending stresses are of local nature and are confined to regions near the ends with exponential stress attenuation in regions away from the ends. For structural design purposes, the bending stresses are assumed negligible for any coordinate $x$ along the length of the cylinder for:

$$x \geq \frac{\pi}{B} \qquad (1)$$

where:

$$B = [3(1-\mu^2)/a^2h^2]^{1/4} \qquad (2)$$

$\mu$ = Poisson's ratio;
$a$ = radius to inner cylinder wall, and
$h$ = thickness of cylinder wall.

The thin wall theory assumes that an elemental portion of the length of the cylinder 11 can be treated as a beam on an elastic foundation (the elastic foundation being the restraint caused by adjacent elements). The differential equation describing the state of the cylinder over its length is:

$$\frac{d^4w}{dx^4} + 4B^4w = P/D \qquad (3)$$

where:

$w$ = radial deflection (inches);
$P$ = external pressure (lbs./in.$^2$) where internal pressure is assumed to be zero; and
$D$ = flexural rigidity $Eh^3/12$ $(1-\mu^2)$ for quartz (E= Young's modulus lbs./in.$^2$).

The general solution is:

$$w = Pa^2/Eh| + C_1 \sin Bx \sinh Bx + C_2 \sin Bx \cosh Bx + C_3 \cos Bx \sinh Bx + C_4 \cos Bx \cosh Bx \qquad (4)$$

This analysis assumes that the forces generated by the pressure on the ends have no effect on the bending. These longitudinal stresses can be included by superposition. Also, this analysis in thin wall theory uses the assumption that the beam is subject to pure bending and neglects the effects of shearing forces.

If the wall becomes very thick, $h/a > 1/3$, the hoop stress cannot be considered constant across the thickness of the wall and the problem becomes more complex. The division between thin and thick walled shells is arbitrary and depends on the accuracy required for the solution of the problem. For instance, the thin wall theory can be used for $h/a \leq 1/3$ if 20–30 percent errors are tolerable.

The sensitivity of the present quartz pressure transducer (QPT) is proportional to the radial stress on the resonator 13 per unit applied pressure and the cylinder transfer function then becomes $\sigma/P$ where the radial stress, $\sigma$, is given by $$\sigma = 2Q_o/t + P \qquad (5)$$

and $$Q_o = -D \frac{d^3w}{dx^3}\bigg|_{x=0} \qquad (6)$$

$w$ is obtained from Equation 4 which is solved with the following boundary conditions $$w|_{x=0} = w|_{x=l} = 0$$
$$\frac{dw}{dx}\bigg|_{x=0} = \frac{dw}{dx}\bigg|_{x=l} = 0$$

These are the boundary conditions for a rigid resonator disc 13 and rigid end caps 15. If $h/a \leq 1/30$, the resonator disc 13 cannot be considered rigid in comparison to the cylinder and the flexibility of the disc 13 must be considered. In the general case the cylinder transfer function is:

$$\sigma/P = \frac{1}{Bt[C] + h/a(1-u)} + 1 \qquad (7)$$

where $$C = \frac{2(\cosh^2 Bl - \cos^2 Bl) - (\sinh Bl - \sin Bl)^2}{2(\sinh Bl + \sin Bl)(\cosh Bl - \cos Bl)}$$

For long, thin walls (i.e., $l > \pi/B$, $h/a \ll 1$), $C = 1/2$ and the transfer function is:

$$\frac{\sigma}{P} = \frac{2}{Bt} + 1$$

Thus, it can be seen from Equation 7 that (1) For very thin walls ($h/a \ll 1$), the transfer function is unity, i.e., the cylinder acts as a membrane and the external pressure acts directly on the edge of the resonator 13.

(2) The term $h/a(1-u)$ tends to reduce the transfer function for thicker walls. This is due to the resonator flexibility.

(3) In the region $0 < h/a < 1/3$, the transfer function increases and forms a broad maximum.

(4) For large $l$, i.e., $l > \pi/B$, the transfer function is independent of length. This occurs because the applied pressure components far removed from the resonator are attenuated and add little to the radial stress at the resonator 13.

Figure 2:
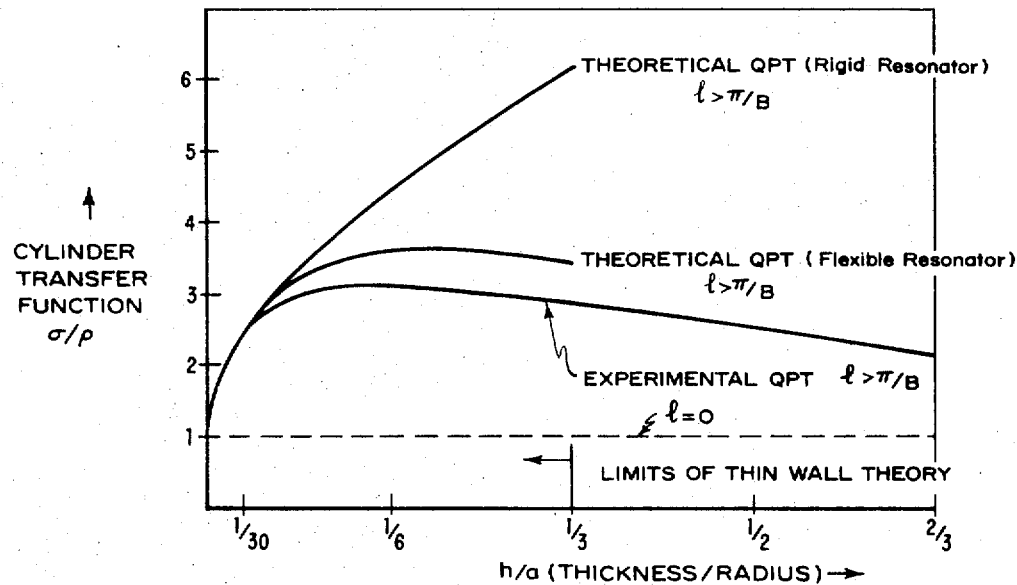
FIG. 2 is a graph including a family of curves describing the transfer fwunction of the cylinder walls of the embodiment of FIG. 1 for various ratios of thickness to radius of the cylinder walls.

This transfer function is shown as a function of $h/a$ in FIG. 2. Curves are shown for both a flexible and a rigid resonator disc 13. The experimental data points in the figure show good agreement between predicted and actual values of sensitivity.

It can be seen from Equation 7 that if all the dimensions of the quartz pressure transducer (QPT) are scaled up or down proportionally, the radial stress per unit applied pressure remains the same. However, since the frequency of the resonator, $f_o$, is inversely proportional to its thickness, the sensitivity will vary in proportion to $f_o$.

The sensitivity of the quartz pressure transducer is:

$$S = (\sigma/P)(\Delta f/\sigma) = \Delta f/P (\text{Hz./p.s.i.}) \qquad (8)$$

It can be seen from Equation 7 that the cylinder transfer function is always greater than unity and, depending on the transducer dimensions, is usually less than four. Therefore, the cylinder amplifies the external stress (P) by this constant factor.

The second factor $(\Delta f/\sigma)$ in Equation 8 describes the basic mechanism of the quartz pressure transducer and relates to the conversion of radial stress into frequency change. Neglecting second-order effects, the vibration frequency of the resonator 13 in the thickness shear mode is given by $$f = \frac{1}{2t}\sqrt{\frac{C_{ij}}{\rho}} \qquad (9)$$

where $C_{ij}$ is the elastic modulus for the rotated cut, $t$ is the resonator thickness, and $\rho$ the density. It is believed that the primary cause of frequency change is due to changes in $C_{ij}$ with stress. (The effect of changes in density and thickness are at least five times smaller.) Therefore, we have:

$$\frac{\Delta f}{\sigma} = \frac{f_o}{2C_{ij}}\left[\frac{dC_{ij}}{d\sigma}\right]$$

The term $dC_{ij}/d\sigma$ is only known from experimental data.

Figure 3:
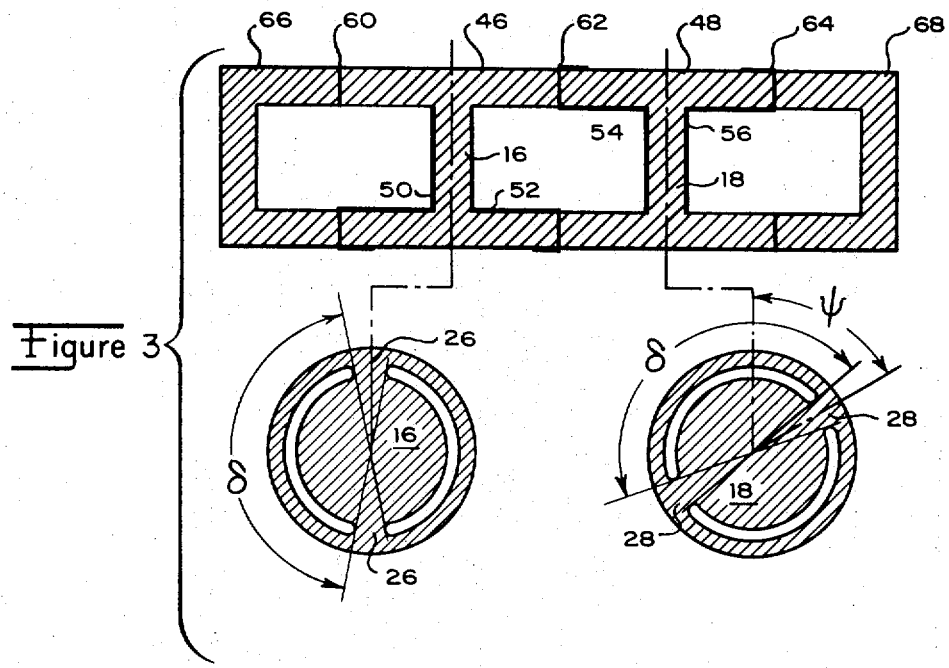
FIG. 3 is a sectional view of a quartz pressure transducer having a pair of resonator sections which are oriented to provide positive and negative changes of frequency with increasing pressure.

The present sensitivity of the pressure transducer may be increased by concentrating the stress at selected locations about the periphery of the resonator section in line with the axis of maximum force sensitivity of the resonator section. This may be accomplished by relieving a portion of the support of the resonator section, as shown in FIG. 3, thereby leaving diametrically-opposed integral mounting tabs such as 26 or 28. For AT- and BT-cut crystal, the angle $\psi$ of maximum pressure sensitivity with respect to the X axis of the crystal is 0° (i.e., is aligned with the X axis). The pressure sensitivity thus increases and the maximum pressure capability decreases with increasing relief angle, $\delta$, as shown in FIG. 3, to the limit of thickness of the mounting tabs 26 which is consistent with sufficient mechanical strength to support the resonator 16 under conditions of shock and vibration.

One important design consideration for the quartz pressure transducer is the joint 21, 23 which must be made between the quartz pressure transducer body 9, 11, 13 and the end caps 15. Even though the crystalline axis of the body and end caps are accurately aligned, the thin layer of joint sealant is a potential source of hysteresis. If the two sides of the joint do not move together under applied pressure, discontinuity stresses will be set up in the joint material.

If these stresses are large enough to cause non-elastic or plastic behavior in the joint, hysteresis can occur. This effect can be minimized by:

(1) Locating the joint a long distance from the resonator so that the discontinuity stress at the joint will be attenuated before reaching the resonator; and (2) Designing the body and end caps so as to minimize the discontinuity stress.

Item 1 can be analyzed using Equations 3 and 4. A shearing stress $Q_{1/2}$ is assumed at the joint. The radial stress at the resonator $Q_0$, resulting from $Q_{1/2}$ can then be determined. The boundary conditions are:

$$w|_{x=0} = \frac{2Q_o}{Et} a(1-u)$$

$$\left.\frac{dw}{dx}\right|_{x=0} = 0$$

$$M|_{1/2} = 0$$

The resulting attenuation envelope is:

$$\frac{Q_o}{Q_{1/2}} = e^{\frac{-Bl}{2}} \left[\frac{1}{1+\frac{4B^3Da(1-u)}{Et}}\right] \quad (10)$$

Equation 10 is valid for $l/2 > \pi/B$. If it is further assumed that $h/a \ll 1$ then $$\frac{Q_o}{Q_{1/2}} = e^{\frac{-Bl}{2}}$$

From Equation 10 it can be seen that (a) Any non-elastic stresses in the joint will be exponentially attenuated as a function of distance away from the joint, and (b) The attenuation of the effects of non-elastic stresses in the joint can be increased by increasing $l$ and decreasing $h$.

Item 2 can be understood by looking at an actual quartz pressure transducer configuration, as shown in FIG. 1. The basis of this preferred embodiment is that the end cap 15 should form the mirror image of the quartz pressure transducer body 9, 11, 13. This will insure equal deflections and equal wall slopes on both sides of the joint 21, 23, thereby minimizing the discontinuity stresses.

The maximum pressure range of the quartz pressure transducer is limited by the physical properties of quartz and the transducer dimensions. Quartz is very weak in tension, the maximum tensile strength being about $14 \times 10^3$ lbs./in.$^2$. The maximum compressive strength of quartz, however, is 24 times as great. It is, therefore, desirable to design the quartz pressure transducer so that every portion is always in compression.

The maximum tensile stress occurs at point O on the median plane 14, as shown in FIG. 1, since the walls tend to bow inward with pressure. The net stress at the outside surface of the cylinder at this point is the sum of the tensile stress due to bending and the longitudinal compressive stress due to the pressure on the end caps 15. The stress at this point is:

$$\sigma = 6M_o/h^2 - Pa/2h \quad (11)$$

(+ is tensile and − is compressive)

where:

$M_o$ = moment in the wall (lb. in./in.)

$$M_o = -D\frac{d^2w}{dx^2}$$

Using Equations 3 and 4 to obtain $M_o$ we have $$M_o = \frac{P}{2B^2}\left[1-\left(\frac{\sigma}{P}\right)\left(\frac{h}{a}\right)(1-u)\right]\left[\frac{\sinh Bl - \sin Bl}{\sinh Bl + \sin Bl}\right] \quad (12)$$

For long, thin walls ($l > \pi/B$, $h/a \ll 1$)

$$M_o = P/2B$$

Thus, it can be shown from these latter two equations that:

(1) $\sigma$ can be made negative (compressive) by the proper choice of $h$ and $l$.

(2) $\sigma$ tends to be compressive for thicker walls and shorter lengths.

Quartz transducers according to the present invention ideally should have dimensions which substantially satisfy the following design criteria:

$$\frac{l}{a} > 1/2 \quad (13)$$

and $$\frac{l}{h} > 1 \quad (14)$$

Also, brittle material like quartz behave elastically up to the point of fracture and unlike metals, fracture occurs with little plastic deformation. Failure is usually in tension, irrespective of loading conditions or geometry and the fracture usually originates at the surface in small micro-flaws which are localized stress concentrators. Thus, the surface conditions are critical in determining the mechanical strength. For this reason, the surface of the quartz transducer is highly polished in practice, especially in regions of high tensile stress.

In one embodiment of the quartz pressure transducer in which the cylinder is approximately 3.35 inches long overall and 1.0 inch in diameter with cylinder walls approximately .2 inch thick, the pressure range is 0–10,000 p.s.i. and the pressure sensitivity is nominally 1.5 Hz./p.s.i. This basic sensitivity is then multiplied up to 100 Hz./p.s.i. giving a full scale output of 1 mHz. The full scale resolution on a common electronic counter would be $1/10^6$ (or 0.01 p.s.i.) for a one-second observation period (gate time) and $1/10^7$ (or 0.001 p.s.i.) for a ten-second observation period. In this embodiment, the accuracy of the quartz pressure transducer is primarily dependent on the resonator stability and the non-elastic errors (i.e., hysteresis, non-repeatability and zero return offset). The typical operating characteristics are as follows:

(1) The short term stability over a ten-second period at constant pressure is ±0.001 p.s.i. ($1/10^7$ F.S.). The long term stability at constant pressure is ±0.01 p.s.i. ($1/10^6$ F.S.) over a one week period.

(2) Hysteresis (i.e., the difference in readings taken at the same pressure when that pressure is approached in different directions) is less than 0.01 p.s.i. (1/10⁶ F.S.).

(3) Non-repeatability (i.e., the difference in readings taken at the same pressure when that pressure is approached in the same manner) is less than 0.01 p.s.i. (1/10⁶ F.S.).

(4) The zero return offset is less than 0.01 p.s.i. (1/10⁶ F.S.).

The quartz pressure transducer typically exhibits non-linearity of frequency vs. pressure of about 0.5% F.S. However, since the non-linearity is repeatable within the tolerance of the non-elastic errors described above, it does not constitute an error, but rather a correction to the digital reading.

In another embodiment of the quartz pressure transducer, as shown in FIG. 3, a pair of resonators 16 and 18 are formed from a single cylindrical core of quartz. Each of these resonators is formed as an integral part of the corresponding supporting cylinder 46, 48 attached thereto only by a pair of integral tabs 26, 28. Gold electrodes 50, 52 and 54, 56 are vacuum deposited on opposite sides of each resonator 16, 18 and an extension thereof as a signal conductor is disposed across a mounting tab, along the inner wall of the cylindrical portion, and out through joints 60, 62, 64 near the resonators. The adjacent cylindrical portions of each of the resonators are substantially equal in length and are bonded together at joint 62 using a suitable cement such as Pyroceram, or the like. This assures that discontinuous stresses at joint 62 are minimized, as previously described. Also, the end caps 66, 68 have cylindrical walls which are substantially equal in thickness and length to the thickness and length (i.e., measured to the surface of the resonator) of the adjacent cylindrical portion of a resonator. This assures that discontinuous stresses at the joints 60, 64 are minimized, as previously described.

In this embodiment, the resonator orientations may be selected to provide maximum, opposite-polarity pressure coefficients of frequency such that the combination of the resulting frequencies provides greater pressure sensitivity and a direct beat frequency output without requiring a separate reference crystal. Also, since both resonators 16, 18 operate in substantially the same environmental conditions, temperature-dependent properties of the resonators cancel out.

For AT-cut resonators, the maximum positive pressure coefficient in resonator 16 is attained for a $\psi$ angle relative to the X axis of 0 degree (i.e. tabs 26 diametrically aligned along the X axis). The angle $\delta$ of peripheral relief may be increased to increase the pressure sensitivity (but decrease maximum pressure capability) up to the limit of tab width sufficient to provide requisite mechanical strength of support of the resonator 16. The $\psi$ angle relative to the X axis for resonator 18 may be selected to be approximately 90 degrees to provide maximum negative pressure coefficient of frequency. Similarly, the relief angle $\delta$ about the periphery may be selected to match the inverse pressure sensitivity of resonator 16. For BT-cut resonators, the $\psi$ angle of resonator 16 may be approximately 0 degree for maximum negative pressure coefficient of frequency and the $\psi$ angle for resonator 18 may be approximately 60 degrees to provide minimum negative pressure coefficient of frequency. Of course, the $\psi$ and $\delta$ angles for resonators 16, 18 may be altered about these stated values to establish selected pressure coefficient of frequency as desired.

Quartz pressure transducers which do not include a pair of resonators, as shown in FIG. 3, usually have operating characteristics which are affected by temperature changes. However, by mounting the quartz pressure transducer in a pressure case, as shown in FIG. 4, the temperature can be set to within ±0.1° C. of the temperature of zero temperature coefficient of frequency and may be held constant within ±0.05° C. over an ambient range of 0 to 50° C., and the quartz pressure transducer reading at any pressure is constant within $2 \times 10^{-7}$ p.s.i. per p.s.i. of applied pressure for ambient temperature changes from 0 to 50° C.

Figure 4:
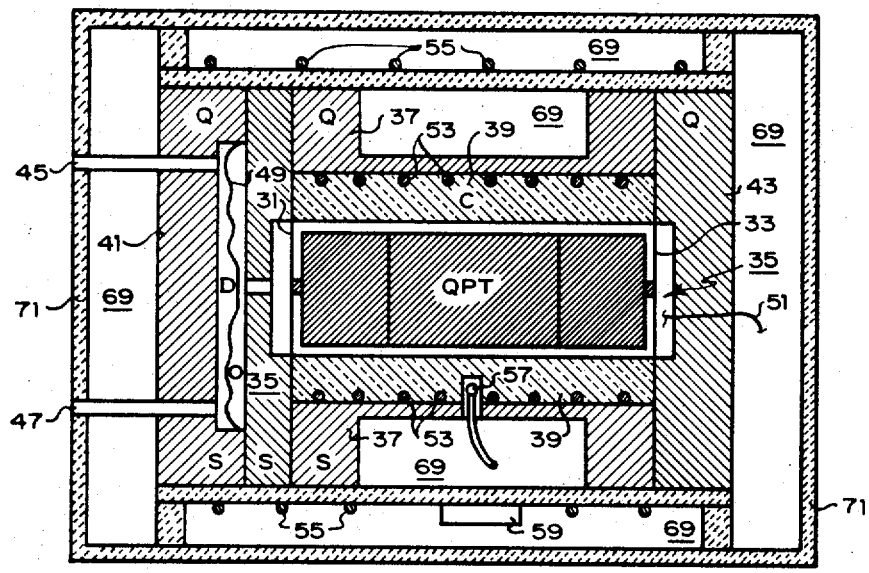
FIG. 4 is a sectional view of the temperature-stabilizing fluid-pressure translating case for the quartz pressure transducer.

In the pressure case shown in FIG. 4, the quartz pressure transducer is suspended by thin flexure webs 31, 33 of stainless steel in a fluid-pressure transmission medium 35. A steel jacket 37 with a copper liner 39 form the pressure vessel. End cap 41 provides for external fluid pressure connections 45, 47 via a flexible diaphragm 49 and for electrical connections 51 to the quartz pressure transducer.

The flexible webs 31, 33 provide a rugged and elastic suspension which exerts only small forces along the quartz pressure transducer longitudinal centerline. Since the quartz pressure transducer is relatively insensitive to forces in this direction, the forces due to the transducer weight (or inertial forces during vibration) and the differential thermal expansion between the quartz and housing materials, have a negligible effect on the performance of the quartz pressure transducer.

The temperature of the quartz pressure transducer is controlled by an inner heater 53 and an outer heater 55. The quartz pressure transducer is subject to temperature changes due to external environmental conditions as well as adiabatic heating of the liquid in chamber 35 upon pressurization. This adiabatic heating (or cooling) is minimized by using a very small volume of liquid (<1 in.³) with a high bulk modulus (i.e., low compressibility). The inner heater 53 controls the temperature of the copper liner 39 at the temperature of zero temperature coefficient of frequency for the resonators. The copper liner 39 has a large heat capacity and acts as a sink (or source) of heat for exchange with the thin film of liquid in the chamber 35 surrounding the quartz pressure transducer. The thermistor 57 is the sensing element for a proportional controller of conventional design which operates the inner heater 53. The outer heater 55 has an on-off type controller 59 and operates at temperatures several degrees below the temperature of the inner heater. The entire pressure case is thermally insulated 69 from the external housing 71. Using this technique, the quartz pressure transducer may be held at a constant temperature within ±0.05° C. The liquid within chamber 35 may be a synthetic phosphate ester. These liquids have a bulk modulus several times higher than petroleum or silicone oils and also have the required dielectric properties. The fluid must also have a low vapor pressure since vacuum backfilling is required to completely fill the pressure cavity with liquid. Also, this liquid has a desirable low coefficient of thermal expansion for reducing the effect of temperature-induced volume changes in the liquid that may cause pressure changes. The choice of a very flexible diaphragm 49 can decrease this source of error to negligible value. The flexible diaphragm 49 provides an interface between the liquid which completely fills the chamber 35 and the external pressure media. Because the liquid surrounding the quartz pressure transducer is slightly compressible, the diaphragm will deflect and there will be a small pressure drop across it. This pressure drop can be made negligible using an elastomer diaphragm formed of silicone rubber of about .005 inch thickness.

Figure 5:
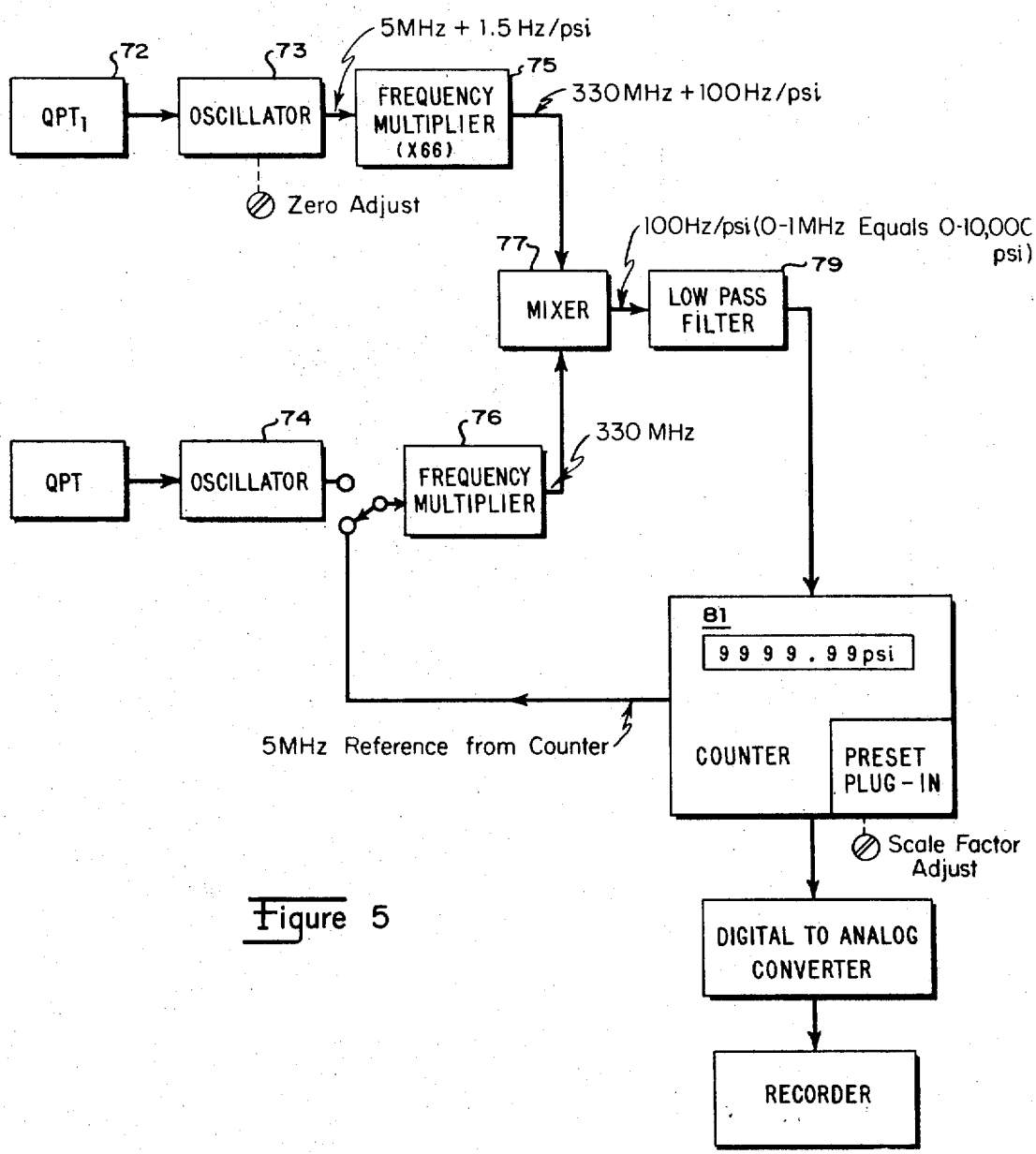
FIG. 5 is a schematic diagram of circuitry for providing a digital readout directly in units of pressure.

The digital readout for the quartz pressure transducer is shown in FIG. 5. The quartz pressure transducer 72 controls the frequency of a 5 mHz. oscillator 73. This oscillator output is harmonically multiplied by 66 in multiplier 75 so that the resulting output at 330 mHz. has a pressure sensitivity of approximately 100 Hz./p.s.i. The multiplied frequency output is compared in mixer 77 with a 5 mHz. reference signal which has been similarly multiplied in multiplier 76. Where a quartz pressure transducer of the type shown in FIG. 3 is used, a reference resonator is not required because each of the resonators 16, 18 may be used to control separate oscillators 73, 74. The mixed and filtered signal from mixer 77 and filter 79 varies from 0–1 mHz., corresponding to 0–10,000 p.s.i.a. This signal can be applied directly to a standard electronic counter 81 for providing a direct readout of pressure. The resolution is 0.01 p.s.i. with a one-second gate time, or 0.001 p.s.i. with a ten-second gate time. The 5 mHz. quartz pressure transducer oscillator may include provisions for altering the mean operating frequency about 5 mHz. Thus the readout of the counter 81 can easily be set for zero (i.e., 0000.00 p.s.i.a.) with a vacuum applied to the quartz pressure transducer 72. Also, the quartz pressure transducers, when calibrated against a primary standard, may have sensitivities or scale factors which vary slightly from unit to unit. This can be compensated for by using a conventional presettable time base 83 in the counter 81. Thus, by presetting the time base 83 of the counter to the scale factor of a particular transducer, the pressure readout of counter 81 is normalized to give the reading directly in units of p.s.i.a.

The pressure transducer of the present invention is thus ideally suited for such special applications as oceanographic instrumentation and the logging of oil well pressure variations with flow rate and time. The full-scale pressure range of the present transducer is capable of withstanding the fluid pressures encountered in submersions to the bottom of the ocean. And the thermal environment at the bottom of the ocean is ideal for in almost all parts of the world the temperature at the bottom is extremely stable at about zero degrees plus or minus two degrees centigrade. For operation in this environment, the present pressure transducer may be designed with zero frequency coeficient of temperature about zero degrees centigrade. For pressure sensing at higher temperatures such as in oil wells, the zero frequency coefficient temperature of the transducer may be selected at approximately the temperature of the operating environment. In this way, the pressure chamber surrounding the quartz pressure transducer need not include elaborate temperature-controlling means to assure accurate pressure sensing.

What is claimed is:

1. Signal frequency apparatus comprising:
   a unitary piezoelectric crystal resonator and housing structure including
      a resonator section having opposite surfaces of selected contour spaced about a median plane and including
         a cylindrical housing section homogeneously integral with the resonator section about a portion of the periphery thereof and extending from said periphery with a selected wall thickness and in a direction substantially normal to the median plane to a first interface surface which is spaced away from the contour of the adjacent surface of said resonator section by a distance $l'$;
         a cylindrical closure section attached to said cylindrical housing section at said first interface surface, said cylindrical closure section having substantially the same diameter and wall thickness as the cylindrical housing section near the first interface surface and having a transverse portion integral about the periphery thereof with the cylindrical walls of said closure section and spaced from said first interface surface by a distance approximately equal to $l'$ for forming a sealed chamber within the cylindrical housing and closure sections between the adjacent surfaces of the resonator section and said transverse portion; and
         electrode means disposed about the resonator section for providing vibration-exciting electric field in said resonator section in response to applied signal.

2. Signal frequency apparatus as in claim 1 wherein:
   said cylindrical housing section extends from the periphery of said resonator section in opposite directions substantially normal to the median plane of said resonator section to first and second interfaces disposed substantially equidistant from the resonator section; and
   a cylindrical closure section is attached to said housing section at each of said first and second interface surfaces to form two sealed chambers on opposite sides of said resonator section.

3. Signal frequency apparatus as in claim 2 wherein said cylindrical closure sections are of the same material as said housing and resonator structure and are attached thereto at said first and second interface surfaces with substantially aligned crystal lattice structures, which said first and second interface surfaces are disposed substantially equidistant between adjacent surfaces of said resonator section and said transverse portions.

4. Signal frequency apparatus as in claim 2 wherein:
   said resonator section is homogeneously integral with said housing section only about substantially diametrically-opposed fractional portions of the periphery of the resonator section for increasing the sensitivity of operating frequency of the resonator section to force applied to the cylindrical walls of the housing section.

5. Signal frequency apparatus as in claim 4 wherein:
   the unitary piezoelectric crystal resonator and housing structure is quartz; and
   said diametrically-opposed portions of periphery of the resonator section that are integral with the housing section are substantially aligned about a diametrical axis that is displaced with respect to the X-axes of quartz by a selected angle $\psi$.

6. Signal frequency apparatus as in claim 5 wherein:
   said resonator section is AT-cut quartz; and
   said selected angle $\psi$ is approximately 0 degree.

7. Signal frequency apparatus as in claim 5 wherein:
   said resonator section is AT-cut quartz; and
   said selected angle $\psi$ is approximately 90 degrees.

8. Signal frequency apparatus as in claim 5 wherein:
   said resonator section is BT-cut quartz; and
   said selected angle $\psi$ is approximately 0 degree.

9. Signal frequency apparatus as in claim 5 wherein:
   said resonator section is BT-cut quartz; and
   said selected angle $\psi$ is approximately 60 degrees.

10. Signal frequency apparatus as in claim 2 comprising:
    a housing including a flexible boundary and surrounding the unitary resonator and housing structure including the cylindrical housing section and cylindrical closure sections;
    support means attached to the unitary structure and to said housing for supporting the unitary structure within said housing; and
    a volume of fluid substantially surrounding the cylindrical walls of the unitary structure and filling the space within said housing to provide pressure-communicating coupling between the flexible boundary of said housing and the cylindrical walls of said unitary structure.

11. Signal frequency apparatus as in claim 10 wherein:
    said support means includes at least one member attached to the transverse portion of a cylindrical closure section for supporting said unitary structure within said housing.

12. Signal frequency apparatus as in claim 1 wherein:
    said cylindrical housing section extends from the periphery of said resonator section in opposite directions substantially normal to the median plane of said resonator section to first and second interface surfaces disposed substantially equidistant from the resonator section;

a second resonator section having opposite surfaces of selected contour spaced about a median plane and including
a second cylindrical housing section homogeneously integral with the second resonator section about a portion of the periphery thereof, said second cylindrical housing section having a diameter substantially equal to the diameter of said cylindrical housing section and extending with said selected wall thickness from the periphery of the second resonator section in opposite directions substantially normal to the median plane of said second resonator section to third and fourth interface surfaces disposed substantially equidistant from the second resonator section by a distance approximately equal to $l'$, said cylindrical housing section and said second cylindrical housing section being attached at said second and third interface surfaces thereof for forming a sealed chamber within said cylindrical housing section and said second cylindrical housing section between adjacent surfaces of the resonator section and second resonator section;
a second cylindrical closure section attached to said second cylindrical housing section at said fourth interface surface, said second cylindrical closure section having substantially the same diameter and wall thickness as the second cylindrical housing section near said fourth interface surface and having a transverse portion integral about the periphery thereof with the cylindrical walls of said second closure section and spaced from said fourth interface surface by a distance approximately equal to $l'$ for forming a sealed chamber within the second cylindrical housing and second closure section between the adjacent surfaces of said second resonator section and said transverse portion; and
second electrode means disposed about the second resonator section for providing vibrating-exciting electric field in said second resonator section in response to applied signal.

13. Signal frequency apparatus as in claim 12 wherein:
said cylindrical housing section and said second cylindrical housing section are of the same material and are attached at the second and third interface surfaces thereof with substantially aligned crystal lattice structures; and
said cylindrical closure section and said second cylindrical closure section are of the same material as said cylindrical housing section and said second cylindrical housing section and are attached to the corresponding ones of said first and fourth interface surfaces with substantially aligned crystal lattice structures.

14. Signal frequency apparatus as in claim 12 wherein:
said resonator section is homogeneously integral with said cylindrical housing section only about substantially diametrically-opposed fractional portions of the periphery of the resonator section; and
said second resonator section is integral with said second cylindrical housing section only about substantially diametrically-opposed fractional portions of the periphery of the second resonator section for increasing the sensitivity of operating frequencies of the resonator section and second resonator section to force applied to the cylindrical walls of said cylindrical housing section and said second cylindrical housing section.

15. Signal frequency apparatus as in claim 14 wherein:
said resonator section and said second resonator section are AT-cut quartz;
said diametrically-opposed portions of the periphery of said resonator section are aligned about a diametrical axis which is displaced from the X axis of quartz by a $\psi$ angle of approximately 0 degree;
said diametrically-opposed portions of the periphery of said second resonator section are aligned about a diametrical axis which is displaced from the X axis of quartz by a $\psi$ angle of approximately 90 degrees.

16. Signal frequency apparatus as in claim 14 wherein:
said resonator section and said second resonator section are BT-cut quartz;
said diametrically-opposed portions of the periphery of said resonator section are aligned about a diametrical axis which is displaced from the X axis of quartz by a $\psi$ angle of approximately 0 degree; and
said diametrically-opposed portions of the periphery of said second resonator section are aligned about a diametrical axis which is displaced from the X axis of quartz by a $\psi$ angle of approximately 60 degrees.

References Cited

UNITED STATES PATENTS

| | | | |
|---|---|---|---|
| 3,339,091 | 8/1967 | Hammond et al. | 310—9.2X |
| 3,396,287 | 8/1968 | Horton | 310—8.1X |
| 2,161,980 | 6/1939 | Runge et al. | 310—9.6X |
| 2,829,284 | 4/1958 | Gerber | 310—9.2X |

OTHER REFERENCES

P. J. Ottowitz, A Guide to Crystal Selection, "Electronic Design," May 10, 1966, pp. 48–51.

MILTON O. HIRSHFIELD, Primary Examiner

B. A. REYNOLDS, Assistant Examiner

U.S. Cl. X.R.

310—8.1. 8.7, 8.9; 340—10

UNITED STATES PATENT OFFICE
CERTIFICATE OF CORRECTION

Patent No. 3,561,832          Dated February 9, 1971

Inventor(s) H. E. Karrer et al

It is certified that error appears in the above-identified patent and that said Letters Patent are hereby corrected as shown below:

Column 1, lines 48-49, "concentration" should read -- concentrations --;

Column 2, line 6, "fwunction" should read -- function

Column 3, line 4, "cylandrical" should read -- cylindrical --;

Column 5, line 6, before "support" insert -- peripheral --;

Column 7, line 66, "coefficient" should read -- coefficients --;

Column 10, line 5, "interfaces" should read -- interface surfaces --.

Signed and sealed this 15th day of June 1971.

(SEAL)
Attest:

EDWARD M.FLETCHER,JR.                    WILLIAM E. SCHUYLER,
Attesting Officer                         Commissioner of Paten